No. 703,099. Patented June 24, 1902.
J. S. TAYLOR.
ONION CLIPPING MACHINE.
(Application filed Oct. 22, 1901.)
(No Model.)
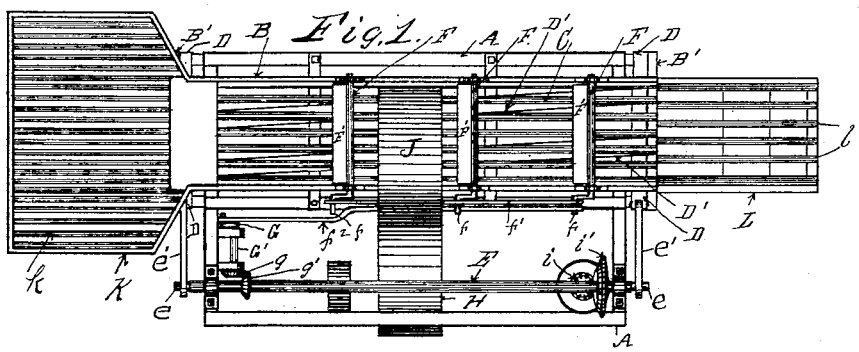
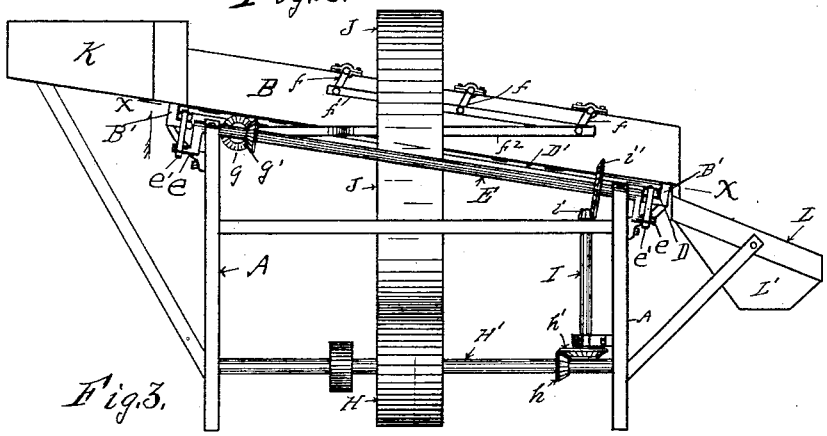
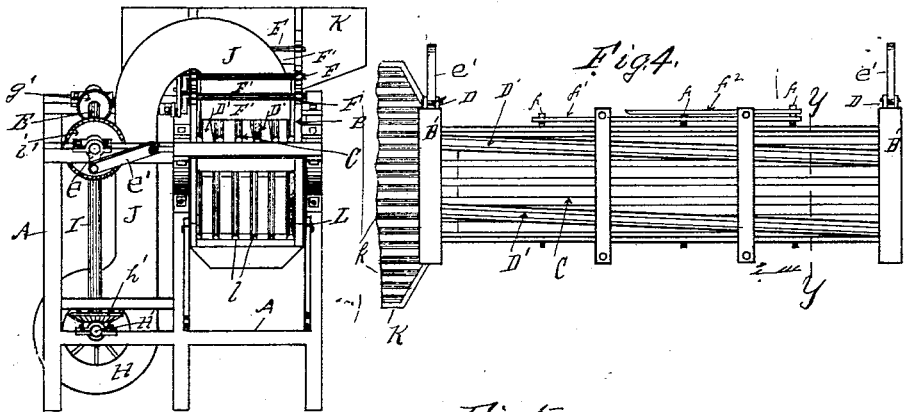
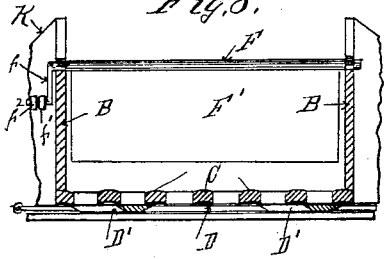
Witnesses.
Inventor.
James S. Taylor
By Sturgeon
Atty

UNITED STATES PATENT OFFICE.

JAMES S. TAYLOR, OF FAIRPLAIN, PENNSYLVANIA.

ONION-CLIPPING MACHINE.

SPECIFICATION forming part of Letters Patent No. 703,099, dated June 24, 1902.

Application filed October 22, 1901. Serial No. 79,549. (No model.)

*To all whom it may concern:*

Be it known that I, JAMES S. TAYLOR, a citizen of the United States, residing at Fairplain, in the county of Erie and State of Pennsylvania, have invented certain new and useful Improvements in Onion-Clipping Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in onion-clipping machines; and it consists, substantially, of an inclined trough or passage the bottom of which is made with longitudinal bars under which vibratory blades operate to clip the onion-tops as the onions travel down said passage in combination with suitable blower or fan mechanism operating upon the onions as they move down said trough or passage to force the tops thereof down through the spaces between the bars forming the bottom of the trough or passage and other mechanism operating therewith, all of which is hereinafter fully set forth and described, and illustrated in the accompanying drawings, in which—

Figure 1 is a top or plan view of my improved onion-clipping machine. Fig. 2 is a side view in elevation of the same. Fig. 3 is an end view in elevation of the same. Fig. 4 is a view of the under side of the inclined trough or passage removed from the machine approximately on the line $x\ x$ in Fig. 2. Fig. 5 is a transverse section of the same on the line $y\ y$ in Fig. 4.

In the drawings thus illustrating my invention, A is the frame of the machine, preferably made higher at one end than at the other. Upon one side of the top of the frame A, I secure an inclined trough or passage B, the bottom of which I make of longitudinal bars C, preferably having their upper surfaces rounded and their under surfaces slightly concaved, as clearly illustrated in Fig. 5. These bars C are spaced approximately half an inch apart, so that onion-tops will pass down between them.

Mounted in guides or ways B' B' on the under surface of each end of the trough B are cross-bars D, to which longitudinal blades D' are secured, which blades operate with a vibratory movement against the under surfaces of the bars C. The blades D' are preferably set slightly diagonally to the bars C, as clearly shown in Figs. 1 and 4, so that they pass the edges of the bars C with a shearing movement. On the frame A there is mounted a shaft E, provided with cranks $e$ at the ends thereof, from which pitmen $e'$ connect with the cross-bars D on the ends of the blades D' and move them back and forth. In the tops of the edges of the trough or passage B, I mount transverse shafts F, provided with wings F', adapted to be vibrated back and forth to facilitate the movement of onions down the inclined trough or passage B. On the ends of the shafts F there are cranks $f$, connected by a connecting-rod $f'$ and from which a pitman $f^2$ extends to a crank G on a shaft G', which is driven by a bevel-gear $g$, intermeshing with a bevel-gear $g'$ on the shaft E. In the lower part of the frame A there is mounted a blower H, and preferably from the shaft H' thereof power is communicated to the shaft E by means of a bevel-pinion $h$, intermeshing with a bevel-gear $h'$ on an upright shaft I, provided with a pinion $i$, intermeshing with a bevel-gear $i'$ on the shaft E. The outlet J of the fan H extends upward and over the top of the trough or passage B and opens down, so as to discharge a strong blast of air downward upon the onions passing down the passage B and operates not only to force the tops thereof downward between the bars C, but also to free the onions from dust and dirt. In lieu, however, of the blower herein described and shown I can, if desired, connect an ordinary suction-fan with the under surface of the trough or passage B and draw the air downward between the bars C, forming the bottom thereof, with equal facility, and thereby produce substantially the same results as I do with the particular arrangement thereof herein shown and described.

Upon the upper end of the trough B there is secured a hopper K, the bottom of which I preferably make of bars $k$, so that dirt and dust will pass down therethrough. Below the lower end of the trough B, I secure a chute L, the bottom of which I make of longitudinal bars *l*, placed about three-fourths of an inch apart, so that the smaller onions will pass between them and through the hopper L' thereunder, while the larger ones will pass out over the end thereof.

I have thus shown and described a convenient mechanism for carrying out and utilizing my invention; but I do not desire to confine myself to the exact construction herein shown and described, as many parts thereof can be modified and varied without departing from the spirit of my invention.

Therefore what I claim as new, and desire to secure by Letters Patent of the United States, is—

1. The combination in an onion-clipping machine, of a trough or passage having the bottom thereof made of longitudinal bars, vibratory blades operating under said bars, mechanism operating said vibratory blades, and a blower or fan operating to force air downwardly through the bottom of said trough or passage, substantially as and for the purpose set forth.

2. The combination in an onion-clipping machine, of an inclined trough or passage having the bottom thereof made of longitudinal bars, vibratory blades operating under said bars, crank-and-pitman mechanism for operating said blades, oscillating wings in said trough or passage, mechanism for operating the same, and a blower or fan forcing air downwardly through the bottom of said trough or passage, substantially as and for the purpose set forth.

3. The combination in an onion-clipping machine, of an inclined trough or passage having the bottom thereof made of longitudinal bars with open spaces between them, transverse guides or ways under the ends thereof, transverse bars operating reciprocally in said guides or ways, longitudinal blades secured to said bars diagonally to the bars forming the bottom of the trough or passage, crank-and-pitman mechanism for actuating said reciprocating cross-bars and blades secured thereto, blower or fan mechanism forcing air downwardly through the bottom of said trough or passage, and a hopper at the upper end of said trough or passage, substantially as and for the purpose set forth.

4. The combination in an onion-clipping machine, of a frame, an inclined trough or passage mounted thereon having the bottom thereof made of longitudinal bars spaced apart from each other, longitudinally-reciprocating blades operating under and diagonally to the bars forming the bottom of the trough or passage, mechanism for operating said blades, a hopper at the upper end of said trough or passage, a longitudinally-barred screen at the lower end of said trough or passage, vibratory wings in said trough or passage, and a blower or fan for forcing air downwardly through the bottom of said trough or passage substantially as and for the purpose set forth.

In testimony whereof I affix my signature in presence of two witnesses.

JAMES S. TAYLOR.

Witnesses:
H. M. STURGEON,
WALTER H. TOMES.